(12) United States Patent
Liu et al.

(10) Patent No.: US 7,649,979 B2
(45) Date of Patent: Jan. 19, 2010

(54) ARTIFACT REDUCTION SYSTEM AND METHOD FOR RADIOLOGICAL IMAGING SYSTEM

(75) Inventors: James Zhengshe Liu, Glenview, IL (US); Tiantian Zhang, Waukesha, WI (US); Kenneth Scott Kump, Waukesha, WI (US); Jingyi Liang, Brookfield, WI (US); Chuande Liu, Waukesha, WI (US); Kadri Nizar Jabri, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/124,355

(22) Filed: May 21, 2008

(65) Prior Publication Data

US 2009/0290686 A1 Nov. 26, 2009

(51) Int. Cl.
*H05G 1/64* (2006.01)
(52) U.S. Cl. .................................. 378/98.11; 378/207
(58) Field of Classification Search ............. 378/98.8, 378/98.9, 98.11, 98.12, 116, 207
See application file for complete search history.

(56) References Cited

U.S. PATENT DOCUMENTS

2008/0025474 A1* 1/2008 Nekovar et al. ............ 378/207

\* cited by examiner

*Primary Examiner*—Courtney Thomas
(74) *Attorney, Agent, or Firm*—Fletcher Yoder PC

(57) ABSTRACT

The effects of electromagnetic interference (EMI) on X-ray image data is corrected by characterizing the EMI and processing the image data to subtract the EMI effects from the image data. The X-ray image data, along with offset data, are collected in a conventional manner, affected by EMI if present, and EMI-characterizing data is immediately collected thereafter by disabling rows of a digital detector (FET off). The EMI-characterizing data, then, is not affected by the presence of image data, and can be used to characterize the amplitude and frequency of the EMI. The EMI-characterizing data is assured of being in phase with the collected image and offset data due to its collection in the same image acquisition sequence immediately following the collection of image and offset data. Artifacts due to the presence of EMI are thus eliminated from reconstructed images based upon the corrected data.

22 Claims, 3 Drawing Sheets

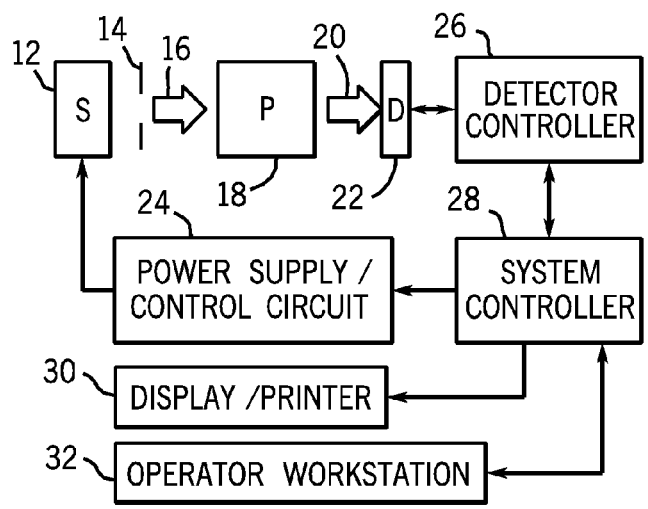
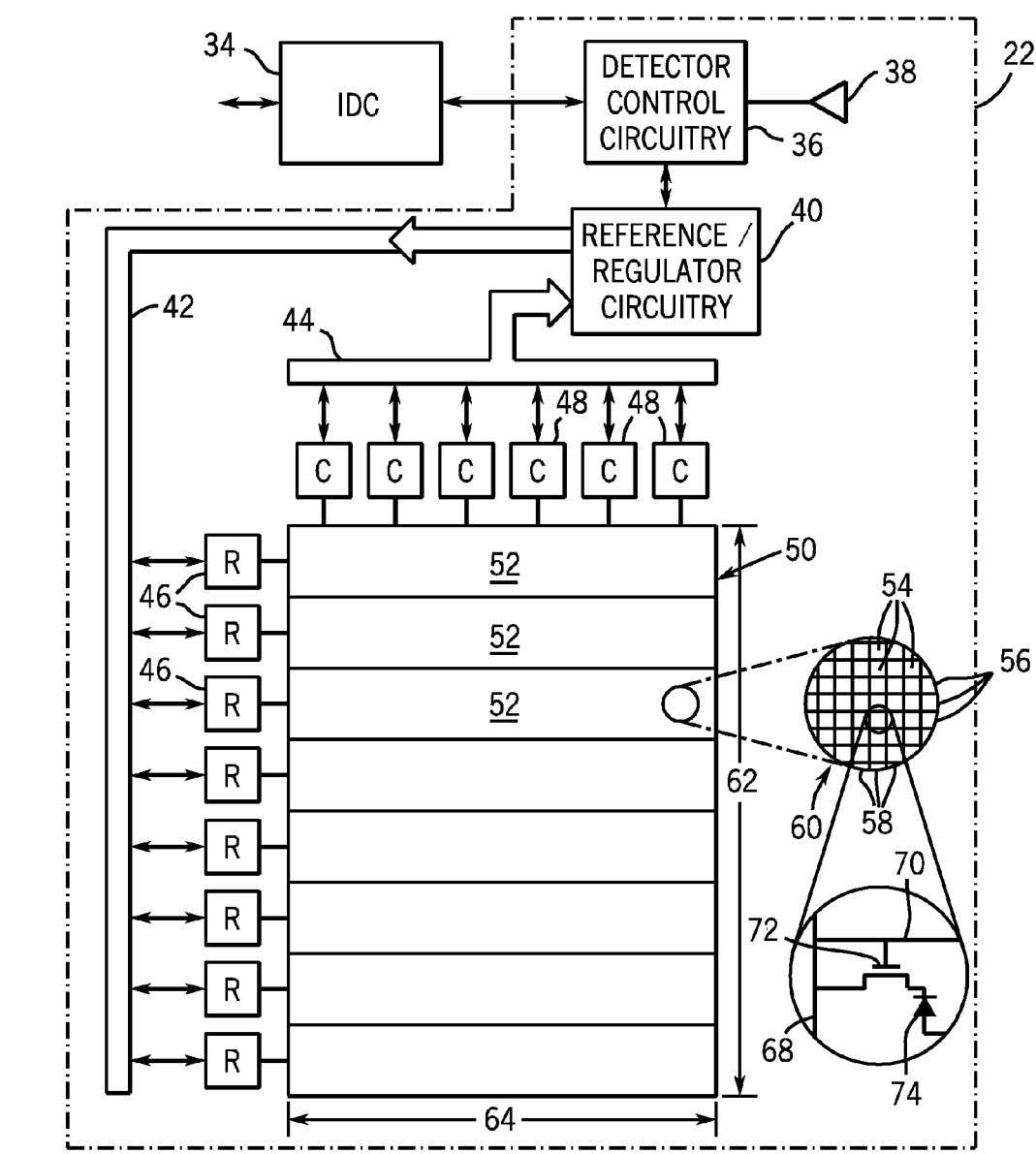

ARTIFACT REDUCTION SYSTEM AND METHOD FOR RADIOLOGICAL IMAGING SYSTEM

BACKGROUND

The present invention relates to digital X-ray imaging systems, and particularly to techniques for correcting effects of electromagnetic interference (EMI) in image data acquired with such systems.

A number of radiological imaging systems of various designs are known and are presently in use. Such systems generally are based upon generation of X-rays that are directed toward a subject of interest. The X-rays traverse the subject and impact a film or a digital detector. Increasingly, such X-ray systems use digital circuitry for detecting the X-rays, which are attenuated, scattered or absorbed by the intervening structures of the subject. In medical diagnostic contexts, for example, such systems may be used to visualize internal tissues and diagnose patient ailments. In other contexts, parts, baggage, parcels, and other subjects may be imaged to assess their contents and for other purposes.

Basic X-ray systems may be designed for generating projection images only. Such projection images may be presented as a well-known reverse image, although the image data itself is subject to various presentations. In addition to projection X-ray systems, the art now offers fluoroscopy systems, computed tomography systems, and tomosynthesis systems that are based on similar X-ray radiation generation and detection. In computed tomography and tomosynthesis systems, for example, images are computed as slices through the subject based upon various reconstruction techniques applied to multiple collected images.

Various artifacts may be present in radiological system data collected in any one of the foregoing types of systems. Certain types of artifacts are well-known and can be handled, eliminated or corrected in various known ways. However, there are still artifacts that cannot be easily corrected or avoided, at least by known techniques. For example, X-ray systems with digital detectors suffer from artifacts due to the presence of electromagnetic interference (EMI). Sources of EMI may include, for example, various electrical and electronic components that may be used in the vicinity of the X-ray imaging systems, such as radio frequency ablators, magnetic catheter navigations systems, and so forth, to mention only a few. Depending upon the phase, frequency and amplitude of such EMI, artifacts in reconstructed images may generally take the form of darker and lighter parallel rows superimposed on the basic image. Such artifacts are not only distracting, but may impair effective use of the images, such as for diagnosis in a medical context. In particular, such artifacts may make small or more detailed features that would otherwise be visible in the images, difficult to detect and discern. They may also interfere with the effective use of computer assisted techniques, such as computer assisted detection and diagnostic algorithms, segmentation algorithms, and so forth that are becoming increasingly prevalent in medical diagnostic, and part and baggage inspection contexts.

There is a need, therefore, for improved approaches to the elimination of artifacts and noise in radiological image data. There is a particular need for a technique that can address EMI-originating noise in X-ray images.

BRIEF DESCRIPTION

The present invention provides systems and methods designed to respond to such needs. In accordance with a first aspect of the invention, a computer-implemented method for processing X-ray image data comprises acquiring first data via a digital detector including X-ray image data and data resulting from electromagnetic interference. Second data is acquired via the digital detector including data resulting from electromagnetic interference but not X-ray image data. The electromagnetic interference is estimated based upon at least the second data. The first data is corrected based upon the characterized electromagnetic interference.

In accordance with another aspect of the invention, a computer-implemented method for processing X-ray image data comprises exposing a digital detector to X-ray radiation, enabling rows of the detector, reading data first data from the detector including X-ray image data and data resulting from electromagnetic interference, disabling the rows of the detector, and acquiring second data from the detector including data resulting from electromagnetic interference but not X-ray image data. The electromagnetic interference is estimated based upon at least the second data, and the first data is corrected based upon the characterized electromagnetic interference.

In accordance with another aspect of the invention, a computer-implemented method for processing X-ray image data comprises estimating electromagnetic interference based upon first and second data acquired via a digital detector, the first data including X-ray image data and data resulting from electromagnetic interference, and the second data including data resulting from electromagnetic interference but not X-ray image data, and correcting the first data based upon the characterized electromagnetic interference.

The invention also provides systems designed to implement functionality of the type set forth above.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical overview of a digital X-ray imaging system in which the present technique may be utilized;

FIG. 2 is a diagrammatical representation of the functional circuitry in a detector of the system of FIG. 1 to produce image data for reconstruction;

DETAILED DESCRIPTION

Figure 3:
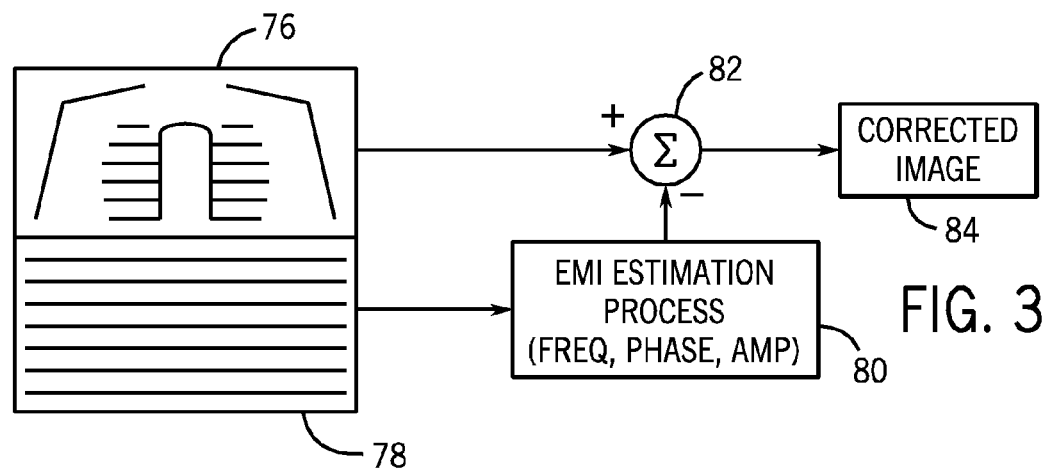
FIG. 3 is a diagrammatical overview of a presently contemplated system for eliminating EMI-originating artifacts from X-ray image data.

FIG. 1 illustrates diagrammatically an imaging system 10 for acquiring and processing discrete pixel image data. In the illustrated embodiment, system 10 is a digital X-ray system designed both to acquire original image data and to process the image data for display in accordance with the present technique. In the embodiment illustrated in FIG. 1, imaging system 10 includes a source of X-ray radiation 12 positioned adjacent to a collimator 14. Collimator 14 permits a stream of radiation 16 to pass into a region in which a subject, such as a human patient 18 is positioned. A portion of the radiation 20 passes through or around the subject and impacts a digital X-ray detector, represented generally at reference numeral 22. As described more fully below, detector 22 converts the X-ray photons received on its surface to lower energy photons, and subsequently to electric signals, which are acquired and processed to reconstruct an image of the features within the subject.

Source 12 is controlled by a power supply/control circuit 24 which furnishes both power and control signals for examination sequences. Moreover, detector 22 is coupled to a detector controller 26 which commands acquisition of the signals generated in the detector 22. Detector controller 26 may also execute various signal processing and filtration functions, such as for initial adjustment of dynamic ranges, interleaving of digital image data, and so forth. Both power supply/control circuit 24 and detector controller 26 are responsive to signals from a system controller 28. In general, system controller 28 commands operation of the imaging system to execute examination protocols and to process acquired image data. In the present context, system controller 28 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

In accordance with the present techniques, the data acquired by system 10 may be perturbed by various sources of EMI (not shown) depending upon the context in which the system is used, and the devices that may surround the system or be used in conjunction with it, interference of various frequencies and amplitudes, some of which may be in phase and out of phase with the acquired data may affectively be superimposed on the acquired data as it is collected. The system allows for characterization and correction of such interference and thus reduction of artifact that would otherwise be present in the image data and visible in reconstructed images based upon the data. The characterization and correction itself may be carried out in any of the foregoing circuitry, including the detector circuitry, the detector controller, or the system controller. Moreover, where desired, the interference may be characterized and corrected in a post-processing step that may be partially or entirely remote from the imaging system itself.

FIG. 2 is a diagrammatical representation of functional components of digital detector 22. FIG. 2 also represents an imaging detector controller or IDC 34 which will typically be configured within detector controller 26. IDC 34 includes a CPU or digital signal processor, as well as memory circuits for commanding acquisition of sensed signals from the detector. IDC 34 is coupled via two-way fiberoptic conductors to detector control circuitry 36 within detector 22. In certain presently contemplated embodiments, other communications systems and technologies may be used, such as Ethernet communications protocols, and wireless communications devices and protocols. IDC 34 thereby exchanges command signals for image data within the detector during operation.

Detector control circuitry 36 receives DC power from a power source, represented generally at reference numeral 38. Detector control circuitry 36 is configured to originate timing and control commands for row and column electronics used to acquire image data during data acquisition phases of operation of the system. Circuitry 36 therefore transmits power and control signals to reference/regulator circuitry 40, and receives digital image pixel data from circuitry 40.

In a present embodiment, detector 22 consists of a scintillator that converts X-ray photons received on the detector surface during examinations to lower energy (light) photons. An array of photodetectors then converts the light photons to electrical signals which are representative of the number of photons or the intensity of radiation impacting individual pixel regions of the detector surface. In certain presently contemplated, the X-ray photons may be directly converted to electrical signals. Readout electronics convert the resulting analog signals to digital values that can be processed, stored, and displayed, such as in a display 30 or a workstation 32 following reconstruction of the image. In a present form, the array of photodetectors is formed of amorphous silicon. The array elements are organized in rows and columns, with each element consisting of a photodiode and a thin film transistor. The cathode of each diode is connected to the source of the transistor, and the anodes of all diodes are connected to a negative bias voltage. The gates of the transistors in each row are connected together and the row electrodes are connected to the scanning electronics as described below. The drains of the transistors in a column are connected together and the electrode of each column is connected to an individual channel of the readout electronics.

In the particular embodiment illustrated in FIG. 2, by way of example, a row bus 42 includes a plurality of conductors for enabling readout from various rows of the detector, as well as for disabling rows and applying a charge compensation voltage to selected rows, where desired. A column bus 44 includes additional conductors for commanding readout from the columns while the rows are sequentially enabled. Row bus 42 is coupled to a series of row drivers 46, each of which commands enabling of a series of rows in the detector. Similarly, readout electronics 48 are coupled to column bus 44 for commanding readout of all columns of the detector.

In the illustrated embodiment, row drivers 46 and readout electronics 48 are coupled to a detector panel 50 which may be subdivided into a plurality of sections 52. Each section 52 is coupled to one of the row drivers 46, and includes a number of rows. Similarly, each column driver 48 is coupled to a series of columns. The photodiode and thin film transistor arrangement mentioned above thereby define a series of pixels or discrete picture elements 54 which are arranged in rows 56 and columns 58. The rows and columns define an image matrix 60, having a height 62 and a width 64.

As also illustrated in FIG. 2, each pixel 54 is generally defined at a row and column crossing, at which a column electrode 68 crosses a row electrode 70. As mentioned above, a thin film transistor 72 is provided at each crossing location for each pixel, as is a photodiode 74. As each row is enabled by row drivers 46, signals from each photodiode 74 may be accessed via readout electronics 48, and converted to digital signals for subsequent processing and image reconstruction. Thus, an entire row of pixels in the array is controlled simultaneously when the scan line attached to the gates of all the transistors of pixels on that row is activated. Consequently, each of the pixels in that particular row is connected to a data line, through a switch, which is used by the readout electronics to restore the charge to the photodiode 74.

It should be noted that in certain systems, as the charge is restored to all the pixels in a row simultaneously by each of the associated dedicated readout channels, the readout electronics is converting the measurements from the previous row from an analog voltage to a digital value. Furthermore, the readout electronics may transfer the digital values from rows previous to the acquisition subsystem, which will perform some processing prior to displaying a diagnostic image on a monitor or writing it to film.

The circuitry used to enable the rows may be referred to in a present context as row enable or field effect transistor (FET) circuitry based upon the use of field effect transistors for such enablement (row driving). The FETs associated with the row enable circuitry described above are placed in an "on" or conducting state for enabling the rows, and are turned "off" or placed in a non-conducting state when the rows are not enabled for readout. Despite such language, it should be noted that the particular circuit components used for the row drivers and column readout electronics may vary, and the present invention is not limited to the use of FETs or any particular circuit components.

As described more fully below, it has, in general, been determined that the EMI-originating artifacts that may be present in image data can be characterized by acquiring the image data (which will include both the desired image data and the EMI noise), and processing this data to characterize the EMI noise, which may then be removed to obtain a corrected image. In a presently contemplated embodiment described below, image data is readout along with offset data, and both of these readout operations includes reading out data with the rows enabled (i.e., "FET on") and with the rows disabled (i.e., "FET off"). The overall scheme for such correction is represented diagrammatically in FIG. 3.

As shown in FIG. 3, as a first step in the process, X-ray image data is acquired as indicated by reference numeral 76. This may be done in a conventional manner using a digital detector of the type described above. Moreover, the image data is acquired with rows enabled in order to readout the depletion of charge of photodiodes in the detector caused by the attenuation, scattering or absorption of X-rays by the subject. This readout is accompanied by readout of EMI-characterizing data as represented generally by reference numeral 78. This readout is performed with the rows disabled to obtain information only on the EMI-originating noise (and any offset used in data processing). The latter dataset is then used in an EMI estimation process as indicated by reference numeral 80, in which the EMI data characterizes the interference in frequency, phase and amplitude. In a presently contemplated embodiment, because the acquisition of EMI-characterizing data follows immediately in the acquisition sequence from the image data acquisition, the phase of the EMI characterizing data is assured of being the same as the phase of the image data. Next, the characterized EMI components are subtracted from the original image data (which would otherwise include the EMI components and any artifacts they might cause), as indicated by summer 82, to arrive at corrected image data 84. It has been found that the technique allows for very accurate characterization of EMI-originating artifacts in the data, removal of these artifacts, and presentations of greatly enhanced corrected images reconstructed from the corrected data.

The particular approach to collecting data used to characterize the EMI and to correct image data to eliminate any EMI-originating artifacts is described in greater detail below. However, the approach to analysis of the EMI for purposes of characterization is presented through the following discussion. In accordance with the invention, then, this approach is employed for characterization of the EMI once the image data and EMI-characterizing data are acquired and stored as described more fully below.

The EMI can be described as a sinusoidal signal in the time domain. Because data for all pixels on each row of the images are acquired at the same time, they are affected by the EMI with the same phase. If the strength of the EMI is the same across the whole detector as is seen in most clinical images, the degree of perturbation is the same for all pixels on a row of the image.

Thus, artifacts due to EMI can be obtained by averaging pixel values on each row of the image to reduce the random additive noise introduced by the measurement system. When EMI strength varies across the detector, the averaging operation cannot be performed over the whole row. In that case, the image should be divided into ROIs (region of interest) and the averaging is then performed with each of the ROIs. As described below, a presently contemplated approach breaks down a 2048×2048 pixel image into 24 ROI'S, but nevertheless characterizes and corrects EMI effects locally for each ROI.

Because the EMI artifact is generally a sinusoidal signal, the contrast of the artifact in the image is determined by the amplitude of the sinusoid. The problem of estimating artifact contrast becomes the estimation of the amplitude of the sinusoid. If $f_{EMI}$ and $a_{EMI}$ are, respectively, the frequency and amplitude of the sinusoid, the artifact can be described by means of the following formula:

$$y(n)=a_{EMI}e^{i2\pi f_{EMI}n}+e(n) \qquad (1);$$

where e(n) is the measurement system noise after averaging. The problem of interest is to estimate $a_{EMI}$ from measurement data sequence $\{y(0), y(1), \ldots, y(N-1)\}$ with N being the number of scan lines.

Moreover, the artifact for multiple scan lines can be represented by the variable Y, such that:

$$Y=[y(0)\,y(1)\ldots y(N-1)]^T \qquad (2);$$

and $$\phi_{EMI}=[1\,e^{i2\pi f_{EMI}}\ldots e^{i2\pi f_{EMI}(N-1)}]^T \qquad (3);$$

where $(\cdot)^T$ denotes the transpose matrix. Estimates of the values of $\{\hat{a}_{EMI}, \hat{f}_{EMI}\}$ and of $\{a_{EMI}, f_{EMI}\}$ may be obtained by minimizing the following nonlinear least squares (NLS) criterion:

$$C_1(a_{EMI}, f_{EMI}) = \|Y - a_{EMI}\phi_{EMI}\|^2 \quad (4);$$

where $\|\cdot\|$ denotes the Euclidean norm. When the noise $e(n)$ is a zero-mean white Gaussian random process, the NLS estimates coincide with maximum likelihood (ML) estimates. When the noise is colored, however, the NLS estimates are no longer the ML estimates, but they can still have excellent statistical performance.

Minimizing the cost function $C_1$ in equation (4) with respect to $a_{EMI}$ gives the estimate of $a_{EMI}$:

$$\hat{a}_{EMI} = (\phi_{EMI}^H \phi_{EMI})^{-1} \phi_{EMI}^H Y = \phi_{EMI}^H Y / N; \quad (5)$$

where $(\cdot)^H$ denotes the complex conjugate transpose.

By inserting equation (5) into equation (4):

$$\|Y - \phi_{EMI}\phi_{EMI}^H Y / N\|^2 = (Y - \phi_{EMI}\phi_{EMI}^H Y / N)^H (Y - \phi_{EMI}\phi_{EMI}^H Y / N) \quad (6)$$
$$= Y^H Y - Y^H \phi_{EMI}\phi_{EMI}^H Y / N;$$

which is minimized by maximizing:

$$C_2(f_{EMI}) = (\phi_{EMI}^H Y)^H (\phi_{EMI}^H Y) / N. \quad (7)$$

Hence $f_{EMI}$ can be determined by:

$$\hat{f}_{EMI} = \underset{f_{EMI}}{\operatorname{argmax}} \{|\phi_{EMI}^H Y|^2 / N\}. \quad (8)$$

Once $\hat{f}_{EMI}$ is obtained, the amplitude $a_{EMI}$ is ready to be determined from equation (5):

$$\hat{a}_{EMI} = \phi_{EMI}^H Y / N \big|_{f_{EMI} = \hat{f}_{EMI}}. \quad (9)$$

It is seen that the term:

$$\phi_{EMI}^H Y = \sum_{n=0}^{N-1} y(n) e^{-j2\pi f_{EMI} \cdot n}, \quad (10)$$

in both equations (8) and (9) is the discrete Fourier transform of sequence $[y(0), y(1), \ldots, y(N-1)]$ that can be calculated via an FFT. Hence the amplitude of the sinusoid can be calculated from the highest peak of amplitude of the FFT divided by N.

It should be noted that the resolution of the frequency estimate from the above FFT may be limited by the number of rows, N. In some cases, this may not be considered accurate enough to correct the artifact. In that case, either the resolution may be increased by padding zeros in the sequence $[y(0), y(1), \ldots, y(N-1), 0, \ldots, 0]$ before performing FFT, or a refining search may be performed around the initial frequency estimate obtained from the FFT. The more accurate amplitude estimate is then updated from equation (9) with the refined frequency estimate.

It can be shown that when the EMI consists of multiple frequencies, the amplitudes can also be calculated the similar way. When the peaks are well separated in the frequency domain, the height of each peak gives the amplitude of each of the frequencies. When two frequencies are too close to be separated in the frequency domain, the amplitude of the frequencies can be obtained iteratively by removing the obtained sinusoids from the data sequence $[y(0), y(1), \ldots, y(N-1)]$.

The approach described above can obtain the best estimation of the sinusoid amplitude. It is not sensitive to electronic noise that may change, such as with panel temperature of the detector.

The foregoing estimation process may be used for the amplitude and frequency of the EMI. As discussed below, the phase of the EMI in a currently contemplated approach is not an issue because data used to characterize the EMI is inherently in phase with data collected for the X-ray image. That is, as discussed with reference to FIGS. 4, 5, 6 and 7 below, the EMI-characterizing data is acquired in the same data acquisition sequence or protocol but where the row enabling FETs are simply switched to an off state. Thus, when the EMI is characterized, it may be subtracted from the image data in a straightforward manner without requiring accounting for or performing phase shifts.

It should be noted that this EMI estimation approach may find application beyond the characterization and image data correction implementations described herein. For example, the EMI monitoring system where the frequency and amplitude of the sinusoids are calculated real-time during image acquisition and warning signals are sent to the operator in the presence of the EMI. Because different observers have different visual sensitivity for artifacts with different frequencies, the warning threshold shall also be frequency dependent. A further application may involve the adjustment of the exposure techniques including kvp, ma, mas, filtration, and so forth according to the frequency and amplitude of the interference as so to reduce or eliminate the artifact in the X-ray image. Yet another application may involve warning of the operator to install shielding equipment such as a shielding shell over the detector once the artifact is beyond the threshold.

For a given point in space, the electromagnetic interference (EMI) can be described as a summation of K sinusoids in time domain:

$$e(t) = \sum_{k=1}^{K} a(k) \cdot e^{j2\pi \cdot f(k) \cdot t}, \quad (11)$$

where $f(k)$ is the frequency and $$a(k) = |a(k)| e^{j \cdot \phi(k)} \quad (12)$$

is a complex number representing the amplitude $|a(k)|$ and phase $\phi(k)$ of the kth sinusoid. From one place to the other, the frequency of the sinusoids remains the same, the amplitude and phase, however, may change depending on the orientation and distance between the source and the observation point.

The interference is added to or, more generally affects the X-ray image data through detector panel and readout circuits described above. In particular, as discussed above, the pixels on the panel are arranged as a two-dimensional matrix with one column being read by means of a specific readout circuit via a data line. The order and time instant of readout of a pixel is controlled by the scan lines. The pixels on a row of the panel are connected by one scan line so that each row is read out at the same time. As a result, the additive interference appears as a row correlated noise type of artifact that is seen as lines or bands in the row direction of the image.

The additive value of the pixel located at row m and column n can be represented by:

$$\tilde{e}_{m,n} = \sum_{k=1}^{K} \tilde{a}_n(k) \cdot e^{j2\pi \cdot \tilde{f}(k) \cdot m}, \quad (13)$$

where $\tilde{f}(k)$ is the frequency of the artifact on the column direction, and $$\tilde{a}_n(k) = |\tilde{a}_n(k)| e^{j\tilde{\phi}_n(k)} \quad (14)$$

represents the amplitude $|\tilde{a}_n(k)|$ and phase $\tilde{\phi}_n(k)$ of the kth sinusoid on column n of the image. Note that the frequency of the image artifact $\tilde{f}(k)$ may be different from the EMI frequency $f(k)$ depending on the relationship between the EMI frequency and the detector line scanning frequency. For instance, if the line time of a portable detector is 0.122496 ms, this corresponds to a line scanning frequency of 1/0.122496 ms=8.164 KHz. According to the signal sampling theorem, when f(k) is less than half of the line scanning frequency, that is 8.164/2=4.082 KHz, the two frequencies are equal. When f(k) is higher than 4.082 KHz in this example, which is usually the case in the field, the two frequencies are different. The amplitude and phase represented by $\tilde{a}_n(k)$ is a function of the column n due to the physical location difference of the columns. The relationship between $\tilde{a}_n(k)$ and a(k) depends not only on the attenuation of the detector case to the EMI, but also the impedance of the interference pickup mechanism.

The problem of interest here is to estimate the parameters of the sinusoids $$\{\tilde{a}_n(k), f(k)\}_{k=1}^{K}$$

so as to reconstruct the image artifact $\{\tilde{e}_{m,n}\}$ and then remove it from the image:

$$\hat{p}_{m,n} = p_{m,n} - \tilde{e}_{m,n} (m=0, 1, \ldots, M-1; n=0, 1, \ldots, N-1) \quad (15),$$

where M and N represent image size, $p_{m,n}$ is the pixel located at row m and column n of the EMI contaminated image, $\tilde{e}_{m,n}$ is the corresponding additive pixel value that is defined by equation (13), and $\hat{p}_{m,n}$ is the EMI corrected pixel value.

The parameters of the sinusoids $$\{\tilde{a}_n(k), f(k)\}_{k=1}^{K}$$

are difficult to estimate from the EMI-containing image data due to the structure that the image contains. However, it has been found that the artifact is independent of the FET state. That is, the additive noise picked up by the detector does not change, regardless of the FET state (i.e., on or off). Thus, the EMI information may be obtained by acquiring more image data with FET-off after the normal image is acquired. The present technique uses this acquisition, and the characterizing approach described above to correct the EMI-containing image data.

Acquisition of data from the detector with the FETs on and off permits estimation of the parameters of the artifacts that are described by the summation of K sinusoids from the "extended" rows of the image (i.e., rows of image data and rows of EMI-characterizing data). Because some of the data is acquired with the FET off in accordance with the present technique described below, the structure can be easily removed from the EMI-free offset that is obtained with the same techniques in the absence of EMI.

Thus, if $\{d_0, d_1, \ldots, d_{M-1}, d_M, \ldots, d_{M+L-1}\}$ is a vector obtained from the row extended image where $\{d_0, d_1, \ldots, d_{M-1}\}$ corresponds to the normal image and $\{d_M, \ldots, d_{M+L-1}\}$ data for rows with the FET on and the FET off, the vector could be a column or the average of several columns of the image (but in a presently contemplated embodiment, is nevertheless localized to a port of the detector). If a new vector is defined by using $\{d_M, \ldots, d_{M+L-1}\}$ with the reversed order:

$$e(l) = d_{M+L-1-l}, l=0, 1, \ldots L-1 \quad (16),$$

the sinusoids contained in $\{d_{M-1}, \ldots, d_1, d_0\}$ become the continuation of those in vector $$\{e(l)\}_{l=0}^{L-1}.$$

Thus, the artifact in $\{d_{M-1}, \ldots, d_1, d_0\}$ may be reconstructed by estimating the parameters of the sinusoids from $$\{e(l)\}_{l=0}^{L-1}.$$

Thus, the image artifact due to EMI may be removed.

To implement this technique, it is desirable that the frequency estimates be accurate. For example, assuming M=L=2048, to correct the artifact on the first row of the image, a value of $e^{j2\times 4095 \times \pi \times f_k}$ is calculated. Thus, errors in the frequency estimates may be significantly be amplified. The initial value of the frequency estimates can be obtained by FFT, but a refining search is desired to reach a more accurate estimate. For the present purposes, it is assumed that any of many known techniques may be used for estimating the parameters of the sinusoids.

As noted above, the correction algorithm can be implemented in the detector. It can also be implemented in the detector or system control circuitry, or even by post-processing in a remote computer. In the latter case, either entire rows with image and EMI characterization data may be transferred to the processing circuitry or the size of these combined rows may be reduced by averaging several columns and then saving the vectors in unused regions of the image. For example, a number of lines of the image (e.g., 12 lines on each of the image borders) may be used to store the averaged column vectors. In this case, the image size will be the same as before. Alternatively, the size of the image may be extended.

Moreover, the image artifact for all offset and X-ray images may be corrected. In case no EMI is present, the amplitude of the sinusoidal estimates will be equal or close to zero. Thus, when EMI is not present, the normal image acquisition and processing may be conducted. When EMI is detected, the "extended" images with row and EMI characterizing data may be acquired and EMI correction performed. Still further, the vector may be stored of the row and EMI characterizing data in the unused regions of the image and EMI correction may be performed when the observer (a physician in a medical context) sees the artifact in the image.

Moreover, an EMI-free reference FET-off image can be obtained regularly through detector quality checking or detector calibration. It can also be obtained from the image including row data and EMI characterizing data when EMI is not detected. The latest obtained EMI-free FET-off image may be used or the last several images may be averaged. In the case of using the averaged image, a simple average or weighted average may be employed, where the most recent image has the largest weight.

Figure 4:
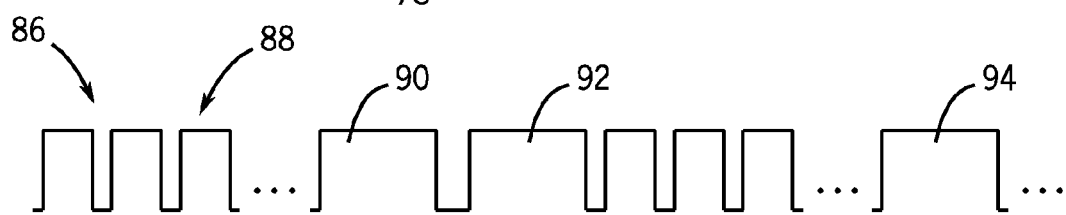
FIG. 4 is a diagrammatical representation of a portion of an acquisition sequence in which both image data, offset data and EMI characterizing data are acquired for correction of EMI data artifacts.

FIG. 4 represents an image data acquisition protocol timeline designed to permit the characterization of EMI and the correction of image data in accordance with foregoing principles. The timeline, designated generally by reference numeral 86 may include periods of detectors scrubbing 88, X-ray reception 90, and data readout 92 and 94. As will be appreciated by those skilled in the art, to account for inevitable loss of charge of the photodiodes of the detector, it may be useful to recharge the photodiodes periodically by a scrubbing operation as indicated by reference numeral 88. Essentially, such operations refresh the diode charges but do not readout data. At some point in the data acquisition protocol, then, the X-ray source will be activated such that the detector is impacted by X-ray radiation during the reception period 90. The X-ray radiation will cause depletion in the charge of the photodetectors at each pixel location corresponding to the amount of X-ray radiation received at the location on the scintillator. The X-ray reception period is followed by data readout as indicated by reference numeral 92. As discussed below, this readout 92, in accordance with the present technique, will include readout of image data that is affected by EMI, when EMI is present at the system, as well as data used to reconstruct the useful image. In a secondary readout period 94, offset data is read out that is similarly affected by the EMI, when such EMI is present.

Figure 5:
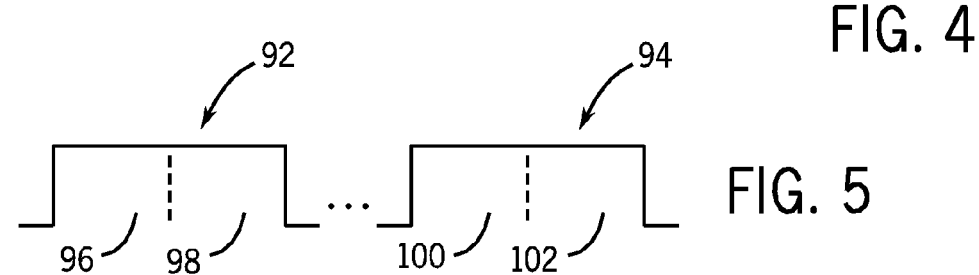
FIG. 5 is a diagrammatical representation of a portion of the acquisition sequence of FIG. 4 in which image, offset and EMI characterizing data are obtained.

FIG. 5 illustrates these readout periods in some what greater detail. As noted above, the rows of the detector are enabled by driver circuitry, typically by altering the state of one or more FETs used in the driver circuitry. To read data from the rows, then, the FET circuitry is turned on to enable such readout. In accordance with the present technique, in the data readout of period 92, the rows are enabled during a first phase 96 in which image data is read out that will be affected by any EMI present. During this same readout period, the rows are disabled (i.e., FET off) and data is acquired as indicated at reference numeral 98. This data will be affected by the EMI present at the system, but will not include image data due to the disabling of the rows. Similarly, in the offset data readout period 94, offset data is read out with the FETs on as indicated at reference numeral 100 to collect offset data and the corresponding EMI characterizing data. Immediately following this, the row driver circuitry disables the rows (i.e., FET off) and readout continues, collecting only information affected by the EMI present.

The data that is collected is used to characterize the EMI such that it can be subtracted from the image data as described above. The duration of the periods for reading out image data, offset data and EMI characterizing data may vary, with these periods being equal to one another or typically with the EMI characterizing data readout being shorter. This period could be longer, however, where desired. In general, the duration during which the readout is performed will be known due to the number of rows in the detector. Readout period 96, then, will acquire data relating to the X-ray signals, the offset (line on), and the EMI signals. Image data acquired during period 98, on the other hand, will include data relating to the offset (line off) and EMI. Similarly, data acquired during period 100 will include offset data (line on) and EMI data, while data acquiring period 102 will include offset data (line off) and EMI data.

Figure 6:
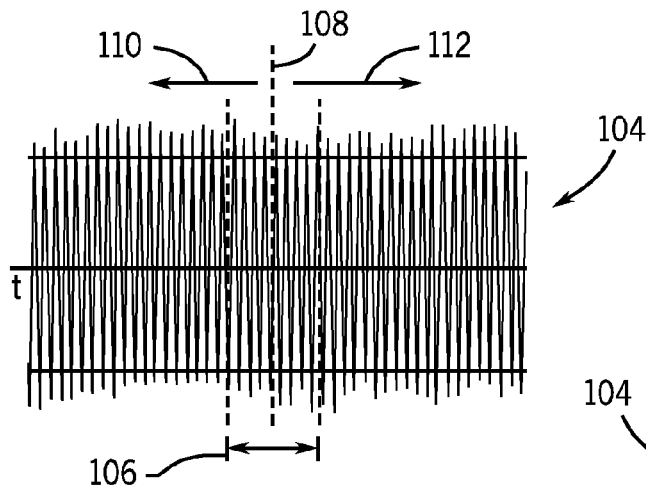
FIG. 6 is a graphical representation of an EMI-originating artifact illustrating continuity between acquisition of image data in acquisition of data used to characterize EMI artifacts.
Figure 7:
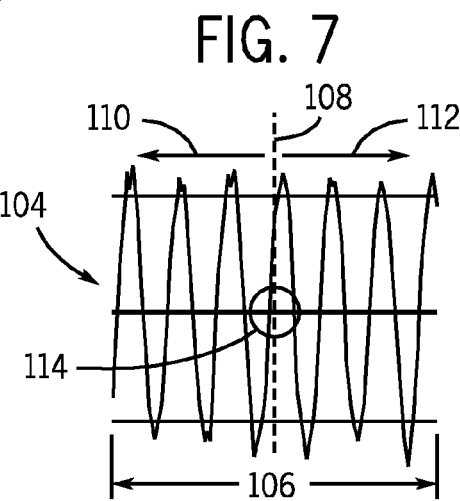
FIG. 7 is a more detailed view of a portion of the artifact shown in FIG. 6.

As noted above, in a presently contemplated embodiment acquisition of the EMI characterizing data follows immediately upon the preceding readout sequence. This ensures that the EMI characterizing data is in phase with the image data or offset data read out immediately before it. FIGS. 6 and 7 illustrate EMI artifact traces illustrating this point. Along the timeline, the artifact trace will appear as brighter and darker sections that are superimposed as lines on the reconstructed image. The artifact trace 104 may be magnified in a FET-off switching window 106 which is enlarged in FIG. 7 as compared to FIG. 6. During image acquisition, the rows are simply disabled by switching the driver circuitry FETs off at time 108. In the embodiment illustrated in FIGS. 6 and 7, for example, readout of a 2048×2048 pixel detector switches the FETs off after readout of line 2048. The switching of the FETs off, then, divides the trace into a FET on time 110 and a FET off time 112. As best seen in FIG. 7, however, the artifact trace 104 is continuous through this switching, indicating that it remains in phase both before and after switching of the FET.

Thus, the foregoing technique allows for characterization of the frequency and amplitude of the EMI based upon the data acquired at periods 96 and 100 in FIG. 5 (which permits determination of the X-ray image data alone as affected by the EMI), and the EMI from data collected during periods 98 and 102 (with cancellation of the offset due to the continuity of phase). The difference between the X-ray image as affected by the EMI, then, and the characterized EMI renders the corrected X-ray image data. It may be noted that removal of the offset alone cannot remove the EMI component due to the phase difference. Indeed, the phase difference may actually enhance the artifact effect.

Figure 8:
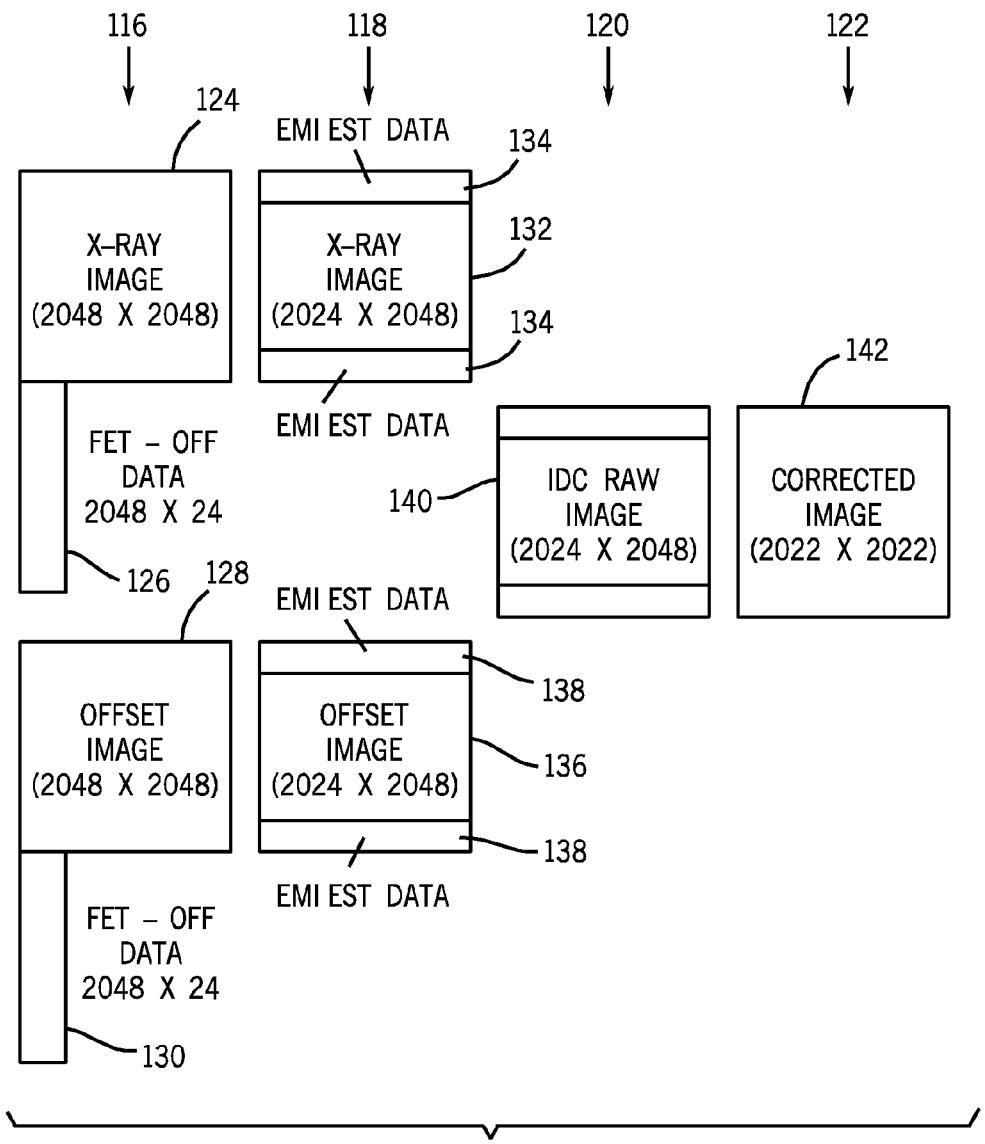
FIG. 8 is a diagrammatical representation of a presently contemplated manner for processing image, offset and EMI characterizing data to arrive a corrected image.

As noted above, various data processing approaches may be envisaged for implementing the EMI characterization and image correction approach described herein. FIG. 8 illustrates an exemplary implementation in which characterizing data is temporarily placed in available rows of the image during processing. In the embodiment illustrated in FIG. 8, reference numeral 116 refers to image data as present in the detector firmware, reference numeral 118 indicates image data as present in the detector software; reference numeral 120 represents image data as present in the IDC software, and reference numeral 122 represents corrected image data present for post-processing. In the detector, as noted above, the X-ray image data 124 is collected during a first readout period, and FET-off data 126 is collected immediately thereafter. While data may be collected for characterizing EMI for all regions of the detector, in the embodiment illustrated in FIG. 8, groups of columns (e.g., 85 columns) are averaged into a single column, resulting in 24 columns of data in the EMI characterizing data 126. Similarly, offset image data 128 is collected during an offset data collection period, immediately followed by collection of FET-off data 130. Here again, the EMI characterizing data is grouped into 24 columns. It should be noted that the grouping of the data into columns nevertheless localizes the effects of EMI across the detector. In practice, more or fewer columns may be grouped to provide more or less localization of these effects.

As indicated by reference numeral 118 in FIG. 8, in the detector software, the FET-off data is conveniently stored in regions 134 at the top and bottom of the X-ray image data 132, and FET-off is similarly stored in available regions 138 around the offset image data 136. This data is ultimately stored in the raw dataset 140 in the IDC software, and following characterization of the EMI and correction for its effects, the corrected image 142 is generated. Other schemes and approaches for the image processing will, of course, be apparent to those skilled in the art. Ultimately, the corrected image data is stored, such as in the memory circuitry of imaging system itself, and used to reconstruct a useful image. Such images may be viewed on monitors of the type described above, printed, transferred to film and so forth. Moreover, any of the acquired data may also be stored for later processing or reference. If viewing of corrected images is not required in real time or near real time, then, the entire EMI characterization and correction process may be performed later, and even remote from the imaging system.

Figure 9:
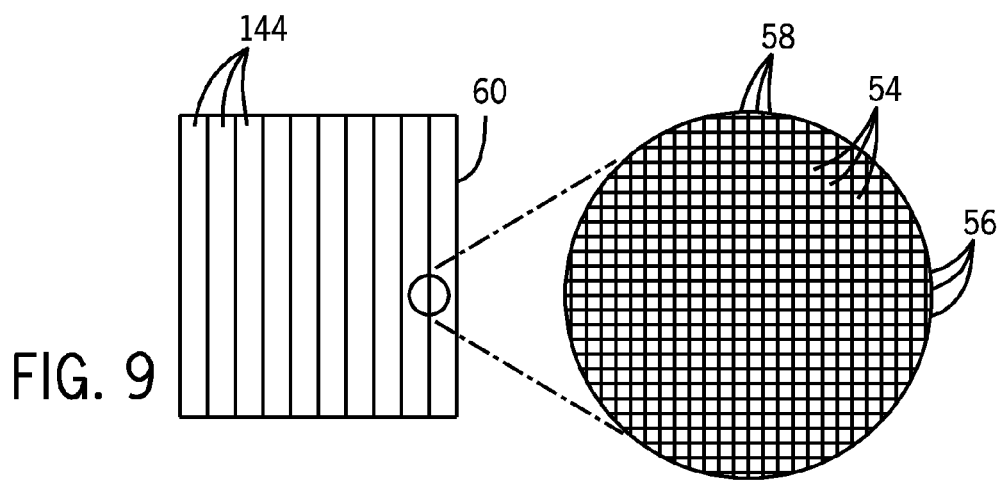
FIG. 9 is a diagrammatical representation of X-ray image data subdivided into groups of columns for a localized EMI artifact correction in accordance with aspects of the present technique.

FIG. 9 represents localization of the affects of EMI across the detector by subdivision of the detector into regions as noted above. As shown in FIG. 9, the detector 60, which includes columns 58 and rows 56 of pixels 54, may be subdivided into a series of columns that are grouped as indicated by reference numeral 144. The EMI characterizing data may be stored for this group of columns. Again, where more localized characterization of EMI is desired, these groups may be made smaller. The EMI characterization and correction, then, is carried out for these localized groups as discussed above.

Technical effects of the invention include the ability to estimate and characterize EMI, and to use that information to correct image data acquired via a radiography system. The effects extent to the ability to perform such tasks in near real time (during or briefly after image data is acquired), as well as in post processing. Improved reconstructed images are thus available by reduction of the EMI effects on the image data.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer-implemented method for processing X-ray image data comprising:
   acquiring first data via a digital detector including X-ray image data and data resulting from electromagnetic interference;
   acquiring second data via the digital detector including data resulting from electromagnetic interference but not X-ray image data, wherein acquisition of the second data immediately follows acquisition of the first data, acquisition of the second data is timed with acquisition of the first data such that effects of the electromagnetic interference on the first data is in phase with effects of the electromagnetic interference on the second data, and the first data is acquired with detector rows enabled for readout and the second data is acquired with the detector rows disabled for readout;
   estimating the electromagnetic interference based upon at least the second data; and
   correcting the first data based upon characterized electromagnetic interference.

2. The method of claim 1, comprising acquiring third data including offset image data and data resulting from electromagnetic interference, acquiring fourth data including data resulting from electromagnetic interference but not offset data, and correcting offset data based upon characterization of the electromagnetic interference.

3. The method of claim 2, wherein acquisition of the third data is timed with acquisition of the first data such that effects of the electromagnetic interference on the first data is in phase with effects of the electromagnetic interference on the second data.

4. The method of claim 1, wherein estimating the electromagnetic interference includes estimating magnitude and frequency of the electromagnetic interference.

5. The method of claim 1, comprising localizing estimates of the electromagnetic interference to regions of interest of the detector.

6. The method of claim 5, comprising averaging the second data for a group of columns of the detector and estimating the electromagnetic interference for each group.

7. The method of claim 5, wherein the portions of first data corresponding to the respective regions of interest are corrected based upon the respective localized estimates of the electromagnetic interference.

8. The method of claim 1, comprising storing the corrected first data in a memory circuit.

9. The method of claim 1, comprising reconstructing an image based upon the corrected first data.

10. A computer-implemented method for processing X-ray image data comprising:
    exposing a digital detector to X-ray radiation;
    enabling rows of the detector;
    reading first data from the detector including X-ray image data and data resulting from electromagnetic interference;
    disabling the rows of the detector;
    acquiring second data from the detector including data resulting from electromagnetic interference but not X-ray image data;
    estimating the electromagnetic interference based upon at least the second data; and
    correcting the first data based upon characterized electromagnetic interference.

11. The method of claim 10, wherein acquisition of the second data is timed with acquisition of the first data such that effects of the electromagnetic interference on the first data is in phase with effects of the electromagnetic interference on the second data.

12. The method of claim 11, wherein acquisition of the second data immediately follows acquisition of the first data.

13. The method of claim 10, comprising acquiring third data including offset image data and data resulting from electromagnetic interference, acquiring fourth data including data resulting from electromagnetic interference but not offset data, and correcting offset data based upon characterization of the electromagnetic interference.

14. The method of claim 13, wherein acquisition of the third data is timed with acquisition of the first data such that effects of the electromagnetic interference on the first data is in phase with effects of the electromagnetic interference on the second data.

15. The method of claim 10, wherein estimating the electromagnetic interference includes estimating magnitude and frequency of the electromagnetic interference.

16. A computer-implemented method for processing X-ray image data comprising:
    estimating electromagnetic interference based upon first and second data acquired via a digital detector, the first data including X-ray image data and data resulting from electromagnetic interference, and the second data including data resulting from electromagnetic interference but not X-ray image data, wherein the first data is acquired with detector rows enabled for readout and the second data is acquired with the detector rows disabled for readout; and correcting the first data based upon characterized electromagnetic interference.

17. The method of claim 16, wherein the first and second data are acquired in a single data acquisition period.

18. The method of claim 16, comprising storing the corrected first data in a memory circuit.

19. The method of claim 16, comprising reconstructing an image based upon the corrected first data.

20. An imaging system comprising:

an X-ray source;

a digital detector;

control circuitry configured to acquire first data via a digital detector including X-ray image data and data resulting from electromagnetic interference, and to acquire second data via the digital detector including data resulting from electromagnetic interference but not X-ray image data, wherein the control circuitry is also configured to enable detector rows for readout during acquisition of the first data, and to disable the detector rows for readout during acquisition of the second data; and processing circuitry configured to estimate the electromagnetic interference based upon at least the second data, and to correct the first data based upon characterized electromagnetic interference.

21. The system of claim 20, wherein control circuitry is configured to time acquisition of the second data with acquisition of the first data such that effects of the electromagnetic interference on the first data is in phase with effects of the electromagnetic interference on the second data.

22. The system of claim 21, wherein the processing circuitry is configured to estimate magnitude and frequency of the electromagnetic interference.

* * * * *